Aug. 13, 1940.    A. W. HILLS    2,211,118

INSTRUMENT LIGHTING

Filed Dec. 15, 1937

Inventor
Arthur W. Hills
By Blackmore, Spencer & Flint
Attorneys

Patented Aug. 13, 1940

2,211,118

UNITED STATES PATENT OFFICE 2,211,118

INSTRUMENT LIGHTING

Arthur W. Hills, Flushing, Mich., assignor to General Motors Corporation, Detroit, Mich., a corporation of Delaware Application December 15, 1937, Serial No. 179,854

1 Claim. (Cl. 240—2.1)

An improvement in instrument lighting constitutes the subject-matter of this invention.

An object is to provide for artificial illumination by indirect lighting.

More specifically the invention aims to illuminate a combined speedometer and odometer by light transmitted from a concealed source through the instrumentality of a ring made from methyl methacrylate or some other synthetic or natural substance having similar light transmitting characteristics.

Another object of the invention is to so illuminate the instrument as to produce a pleasing effect.

Other objects such as economy in production and simplicity in assembly will be understood from the following description.

Figure 1:
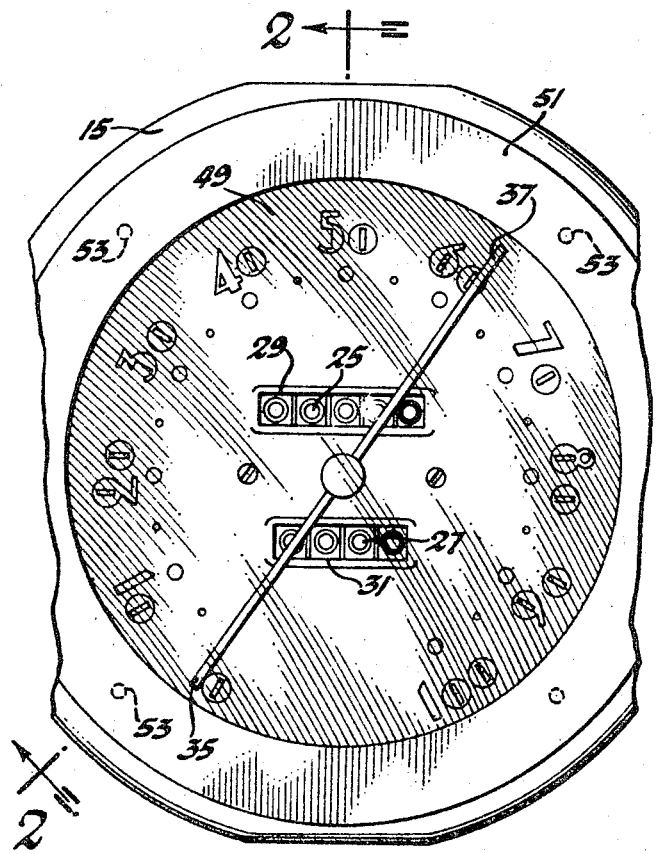
Figure 1 is a front view in elevation.
Figure 2:
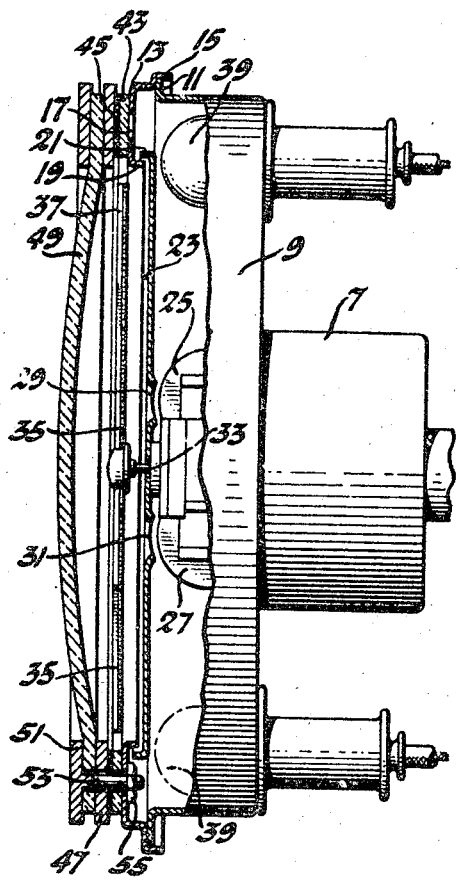
Figure 2 is a section on line 2—2 of Figure 1.
Figure 3:
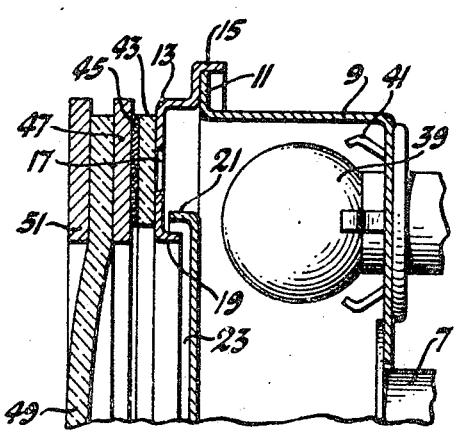
Figure 3 is an enlarged sectional view.

Numeral 7 represents an instrument casing carried by the housing 9. The housing has a radial flange 11. A ring 13 is formed with an axial flange 15 adapted to be bent over flange 11 to secure the ring 13, and parts carried thereby to the housing. A plurality of openings are distributed in a circular series about the ring 13, one such opening being shown in Figures 2 and 3 and marked 17. The inner margin of ring 13 has an axial flange 19 located within an overlapping flange 21 of an opaque dial plate 23, the dial plate being adapted to be mounted on the frame of the instrument concealed within the housing 9. The instrument is provided with rotating figure wheels 25 and 27. These figure wheels are visible through openings 29 and 31 in the dial plate 23. When the instrument is used on a vehicle these figures are intended to represent the distance traveled. The instrument has a rotatable stem 33 carrying a pointer 35, the latter preferably having flat ends 37. Within the housing are light bulbs 39 held in position by suitable clips 41. The light from these bulbs illuminates the figure wheels and is deflected from their surfaces through openings 29 and 31. No direct light is transmitted from the light sources to the observer but light does pass axially through openings 17. These openings are covered by a ring formed from methyl methacrylate or from some other synthetic or natural substance having similar light transmitting characteristics. The expression "highly transparent" will be used hereinafter to define the light transmitting characteristics of the ring. A coat of paint on the front face of the ring 43 is marked 45. It deflects the light which has been transmitted through the ring. The deflected light pases radially from the ring and is received within the flattened ends of the pointer 35. The pointed is made preferably from the same highly transparent material and if preferred its rear surface may be painted so that it may be readily seen by reflected light. It will be noticed that the flattened ends of the pointer are located quite closely adjacent the ring 43 so that these ends effectively pick up the light from the ring. A ring of metal marked 47 overlies ring 43. A glass cover 49 has its marginal region overlying ring 47 and a metallic retaining ring 51 holds the parts assembled. The retaining ring 51 is formed with a threaded stud 53 extending through holes in the cover glass and the adjacent rings. The stud 53 also extends through a hole in ring 13 and is secured thereto by a nut 55.

The above construction is efficient and is cheap to manufacture. It prevents the transmission of direct light to the observer and illuminates the odometer figures, the pointer, and the figures on the dial plate.

I claim:

Means to illuminate an instrument having a dial and a rotating pointer, said means comprising a concealed source of light and a ring of highly transparent material surrounding said dial and said pointer, said ring having a coating on that surface remote from the source of light, said ring receiving light from said source and transmitting light from its coated surface and through said ring to said dial and pointer, said pointer being of highly transparent material having flattened ends adjacent said ring and coated to reflect light whereby the light from the coated surface of the ring is effectively collected by the flattened ends of the pointer, transmitted therethrough by internal reflection and reflected from the coated surface thereof.

ARTHUR W. HILLS.